(12) United States Patent
Said et al.

(10) Patent No.: US 10,378,441 B2
(45) Date of Patent: Aug. 13, 2019

(54) IN-STREAM BURNER MODULE

(71) Applicant: Fives Pillard, Marseilles (FR)

(72) Inventors: Fouad Said, Marseilles (FR); Louis Ricci, Roquefort la Bedoule (FR); Yannick Boudet, Cabries (FR)

(73) Assignee: FIVES PILLARD, Marseilles (FR)

( * ) Notice: Subject to any disclaimer, the term of this patent is extended or adjusted under 35 U.S.C. 154(b) by 361 days.

(21) Appl. No.: 15/117,760

(22) PCT Filed: Jan. 26, 2015

(86) PCT No.: PCT/FR2015/050176
§ 371 (c)(1),
(2) Date: Aug. 10, 2016

(87) PCT Pub. No.: WO2015/121559
PCT Pub. Date: Aug. 20, 2015

(65) Prior Publication Data
US 2016/0356217 A1    Dec. 8, 2016

(30) Foreign Application Priority Data

Feb. 12, 2014 (FR) ...................................... 14 51064

(51) Int. Cl.
*F23R 3/20* (2006.01)
*F02C 3/34* (2006.01)
(Continued)

(52) U.S. Cl.
CPC ................ *F02C 3/34* (2013.01); *F23D 14/20* (2013.01); *F23R 3/20* (2013.01);
(Continued)

(58) Field of Classification Search
CPC ...... F23R 3/18; F23R 3/20; F23R 3/22; F23R 3/24; F23R 2900/03341; F02C 3/34;
(Continued)

(56) References Cited

U.S. PATENT DOCUMENTS 3,732,059 A    5/1973  Goodnight
3,830,620 A *  8/1974  Martin .................. F23D 14/045
                                                      431/350
(Continued)

FOREIGN PATENT DOCUMENTS

EP    0 222 654    5/1987
EP    2 442 026    4/2012
(Continued)

OTHER PUBLICATIONS

International Search Report dated May 26, 2015 out of PCT Priority Application No. PCT/FR2015/050176 (6 pages including English translation).

(Continued)

*Primary Examiner* — Scott J Walthour
*Assistant Examiner* — Todd N Jordan
(74) *Attorney, Agent, or Firm* — Brinks Gilson & Lione; John C. Freeman

(57) ABSTRACT

A burner module in an air stream has a feed pipe of substantially circular cross section and an axis, fuel injection orifices situated on the pipe and intended to produce a flame, oxidant injection orifices and fins arranged symmetrically with respect to a plane P of flow of the fuel upstream of the burner module and laterally on the pipe on each side of the fuel injection orifices. There are at least two fuel injection orifices in a section of the pipe and they have an axis that makes an angle α with the plane of flow P of the oxidant. In this way, gas is injected at several orifices situated in at least two divergent planes. These two planes delimit a space to which fuel and to which oxidant are not supplied.

15 Claims, 8 Drawing Sheets

(51) Int. Cl.
*F23D 14/20* (2006.01)
*F23R 3/18* (2006.01)

(52) U.S. Cl.
CPC .............. *F23D 2900/14003* (2013.01); *F23D 2900/21003* (2013.01); *F23R 3/18* (2013.01)

(58) Field of Classification Search
CPC ........... F23D 14/20; F23D 2900/14003; F23D 14/70; F23D 2900/21003
USPC .......................................... 431/354, 352, 116
See application file for complete search history.

(56) References Cited

U.S. PATENT DOCUMENTS

| | | | | |
|---|---|---|---|---|
| 4,237,858 A | * | 12/1980 | Goodnight | .............. F23C 3/004 126/360.2 |
| 4,730,453 A | | 3/1988 | Benoist | |
| 4,895,514 A | * | 1/1990 | Cantryn | .................. F23D 14/74 431/350 |
| 6,301,875 B1 | * | 10/2001 | Backlund | ................ F23D 14/70 431/202 |
| 6,929,470 B1 | * | 8/2005 | Lifshits | .................. F23D 91/02 431/350 |
| 2005/0014103 A1 | * | 1/2005 | Perry | ...................... F23D 14/64 431/352 |
| 2011/0219776 A1 | * | 9/2011 | Bunker | ..................... F23R 3/20 60/772 |
| 2014/0007579 A1 | * | 1/2014 | Ainslie | ..................... F23R 3/28 60/746 |

FOREIGN PATENT DOCUMENTS

| | | |
|---|---|---|
| JP | S 6089610 | 5/1985 |
| JP | S 6089611 | 5/1985 |

OTHER PUBLICATIONS

Written Opinion dated May 26, 2015 out of PCT Priority Application No. PCT/FR2015/050176 (6 pages including English translation).

* cited by examiner

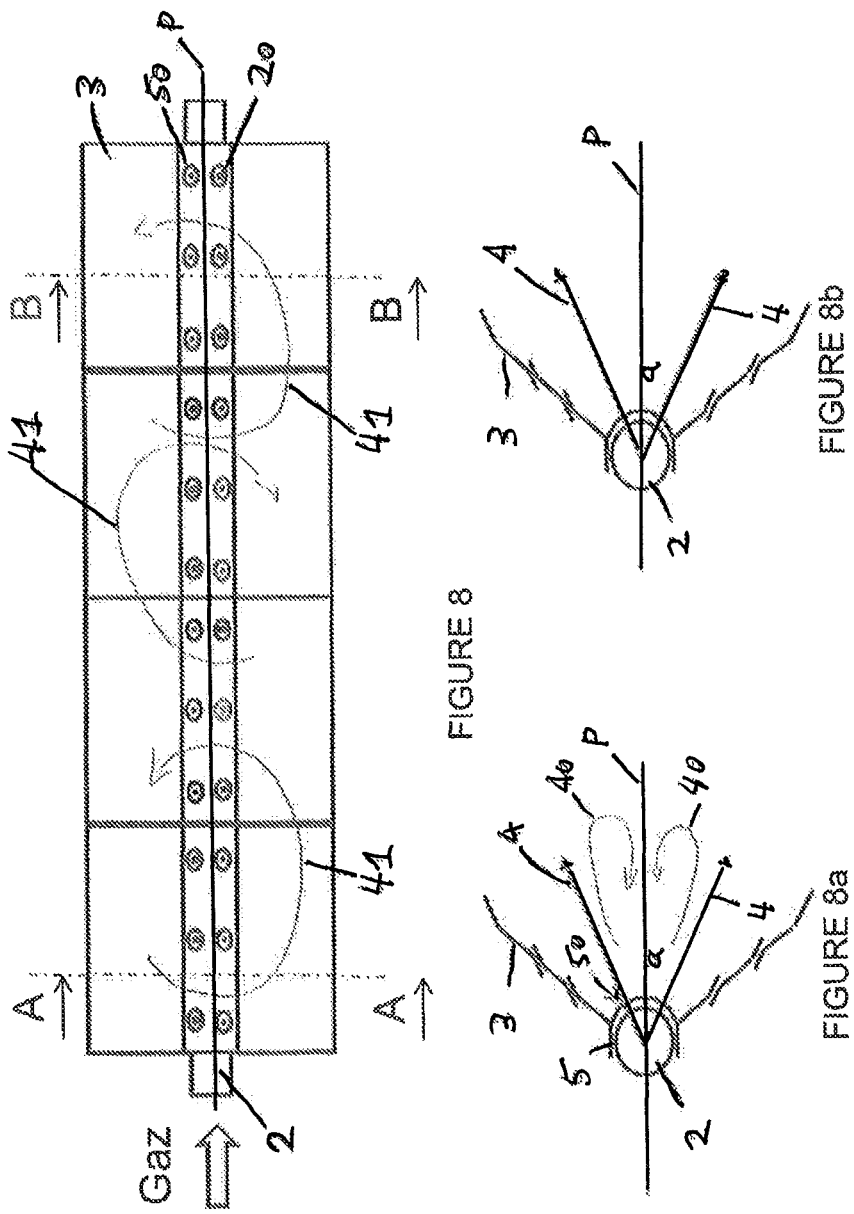

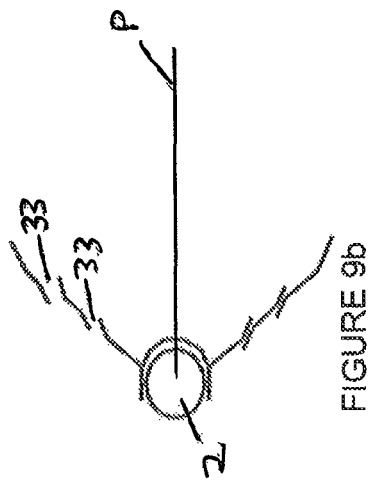
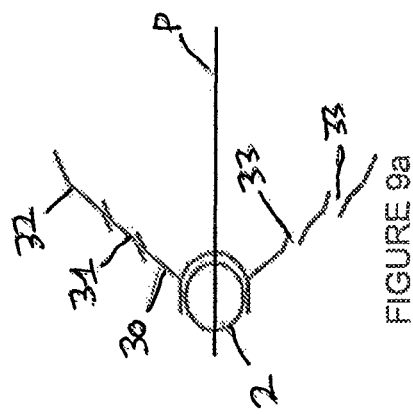

IN-STREAM BURNER MODULE

This application claims priority to International Application No. PCT/FR2015/050176 filed Jan. 26, 2015 and to French Application No. 1451064 filed Feb. 12, 2014; the entire contents of each are incorporated herein by reference.

BACKGROUND

The present invention relates to a burner in an air stream used for the direct heating of air or of combustion gas from turbines or engines and more particularly to the in-stream burner module the side-by-side juxtaposition of which on manifolds constitutes the in-stream burner. This type of burner uses as oxidant the turbine exhaust gases (TEG) or engine exhaust gases that have an oxygen concentration (in wet smoke) lower than the ambient air, a temperature higher than the ambient temperature and, generally, a speed on exiting the burner that is relatively low, and as fuel natural gas, shale gas, oil gas or gases coming from industrial processes.

SUMMARY

In recent years, gas turbines and recovery boilers have evolved towards an increase in the energy efficiency of the combined cycles. Consequently, the turbine exhaust gases (TEG) are characterized by oxygen concentrations in wet smoke that are ever lower (between 9% and 13%) and having more variable and higher temperatures (between 350° C. and 700° C.).

Moreover, the evolution of the steam production cycles is behind the positioning of the burners on the downstream side of a first exchanger stage, which has the consequences of both:

increasing the section of the trunking in the burner layout and therefore reducing the speed of the turbine gases in this section; in most cases, for correct operation of the burners (flame stability), this necessitates increasing the local speed by adding costly baffles, and reducing the initial temperature of the turbine gases to temperatures between 350° C. and 550° C. inclusive.

The evolution of all these parameters makes the conditions for good combustion more difficult, and more particularly flame stability and control of carbon monoxide (CO) emissions.

On the other hand, controlling the flame length is a major stake since it makes it possible to control the downstream temperature profile at the same time as minimizing the length of the very costly trunking.

Known in-stream burners do not provide the mixing and the local pressure reduction necessary to control the carbon monoxide (CO) emissions and flame stability under these difficult conditions, notably at low TEG speeds.

The object of the invention is to propose a new in-stream burner module making it possible to address these problems and notably to achieve:

flame stability with low $O_2$ concentrations,
operation with very low CO emissions,
operation with low TEG speeds making it possible to reduce or even to eliminate the baffles,
operation with high linear powers,
operation with short flames,
thanks to new arrangements that increase the speed of the TEG/gas mixture of the burner module and the areas of local pressure reduction by new and optimized aerodynamics.

The burner module in an air stream in accordance with the invention therefore comprises a feed pipe of substantially circular cross section and having an axis, fuel injection orifices situated on the pipe and intended to produce a flame, oxidant injection orifices and fins, or caps, forming a so-called module or block structure, disposed symmetrically with respect to a plane P of flow of the fuel upstream of the burner module and laterally on the pipe on each side of the fuel injection orifices, it is wherein there are at least two fuel injection orifices in a section of the pipe and they have an axis that makes an angle α with the plane of flow P of the fuel. The gas is therefore injected at a plurality of orifices situated in at least two divergent planes. These two planes delimit a space with no input of fuel and with no input of oxidant, which encourages the internal recirculation of the combustion gases within the flame and brings a great part of the burnt gases toward the center. This also makes possible faster mixing of the gas with the TEG than a co-current flow. This angular injection and the induced recirculation simultaneously achieve flame stability, a short flame and recombustion of the CO by increasing the dwell time. It is possible to produce a burner comprising a plurality of burner modules or blocks with these features.

The angle α is advantageously between 10° and 30° inclusive.

In accordance with one particular embodiment, the injection orifices have a section of different size on each side of the plane P. The gas injection orifices of the same module are therefore symmetrically disposed relative to the flow plane P and can have sections and consequently gas flow rates that are different between the top and the bottom (if the plane P is horizontal).

In accordance with one particular feature, the two fuel injection orifices have an axis that crosses the axis of the pipe.

In accordance with another feature, at least two other secondary fuel injection orifices makes an angle ξ with the plane of flow of the fuel and the angle ξ is greater than the angle α. This makes possible staggered TEG arrival that favors recirculation and achieves an optimum fuel/oxidant ratio.

The secondary fuel injection orifices of angle ξ advantageously have a section representing 5% to 20% of the total section of the fuel injection orifices. This staggered injection of the gas with a staggering ratio of 5% to 20% achieves very low NOx emissions (low-NOx operation). This complementary injection is effected between the injection planes of the fuel orifices and the fins.

In accordance with one particular arrangement, it comprises fins making an angle β with the flow plane of the fuel such that the angle β is between 2α and 3α inclusive. This results in a large module (block) size that protects the flared development of the flame and the internal recirculation linked to the angular injection. This makes it possible to maintain a hot zone that limits the formation of CO. A high stabilization local pressure reduction is therefore created even during operation with low TEG speeds. At the same time, having the angle of the caps equal to two to three times the injection angle of the gas makes it possible to generate the spaces necessary for the correct introduction of the TEG and their mixing with the gas jets in the combustion zone and the development of the main vortices.

The fins advantageously have a section including oxidant injection openings. A staggered TEG arrival favors recirculation and achieves an optimum fuel/oxidant ratio, and is achieved thanks to the openings that are preferably in the form of slots and the number and the section, of which are determined in such a manner as to produce a low percent of the stoichiometric air flow rate (of the order of 5% to 25%).

In accordance with one particular feature, the openings have a section between 3% and 15% inclusive of the section of the fins. The flow section of these openings may vary as a function of the TEG oxygen and speed characteristics.

In accordance with another particular feature, the openings have a section of different size of each side of the plane P. The sections of these openings and consequently of the TEG flow rates through them can therefore be different between the top and the bottom.

In accordance with another feature, the openings include deflection elements making an angle $\theta$ with the plane P of flow of the fuel.

The angle $\theta$ is advantageously substantially equal to the angle $\alpha$. The deflection elements confer on the passage openings an angle substantially identical to the injection angle of the gas.

The section of the openings advantageously increases with the distance between the orifices to optimize the progressive introduction of air into the flame and to reduce the formation of CO.

In accordance with one particular feature, it comprises a shield placed between the pipe and the flame, said shield having holes situated in line with the injection orifices. An inductive partial premixing of the gas jet with the oxidant at the level of the attachment shield. This accelerates TEG/gas mixing and improves flame stability. The section of the premixing orifice situated in the shield represents 15 to 40 times the section of the gas outlet orifice. The premixing orifice is situated at a distance from the gas orifice between 0.1 and 0.3 times inclusive the diameter of the tube.

The holes are advantageously situated on a wall of the shield that makes an angle $\delta$ relative to the axis of the injection orifices. This favors the aspiration of the oxidant by the gas jet.

The angle $\delta$ is advantageously substantially equal to 90°. This favors local turbulence and consequently flame stability despite the low oxygen, temperature and TEG speed levels.

In accordance with one particular feature, the burner module comprises baffles situated in an exterior part of the burner module and said baffles have a rim that has an angle equal to and opposite that of the deflection element situated farthest from the pipe. This special shape of the baffles or baffle ends makes it possible to produce a flow of the TEG around the modules that is parallel or nearly parallel to the plane of flow of the gas in order to limit the formation of CO by chilling effect. This shape is characterized by symmetry between the end of the modules and the end of the blocks.

The burner module advantageously has an area projected onto a plane perpendicular to the flow of the TEG between 0.1 m²/MW and 0.3 m²/MW inclusive. The size of the module is defined by its area projected onto a plane perpendicular to the flow of the TEG and this size is particularly advantageous for an upstream (wet smoke) oxygen concentration between 9% and 14% inclusive.

The combustion method in accordance with the invention comprising an in-stream burner module with at least one of the foregoing characteristics, such that the oxidant has an oxygen concentration less than 21%.

Premixing is advantageously effected in a space between the pipe and the shield.

The invention also concerns an in-stream burner consisting of modules having the foregoing features.

Two adjacent modules advantageously have injection orifices with sections of different size on each side of the plane P alternately. By alternating modules with the gas orifice sections increased on one side of the plane P (for example at the bottom) and modules with the gas orifice sections increased on the other side of the plane P (for example at the top), complementary turbulence is therefore created in the plane perpendicular to the flow plane P and parallel to the axis of the tube. This complementary turbulence accelerates the mixing of the gas with the TEG and reduces the flame lengths. The ratio of the sections between the orifices at the top and the orifices at the bottom may therefore vary between 0.25 and 4 and advantageously between 0.5 and 2.

Two adjacent modules advantageously have openings of different size on each side of the plane P alternately. By alternating modules with the gas orifice sections increased on one side of the plane P (for example at the bottom) and modules with the gas orifice sections increased on the other side of the plane P (for example at the top), complementary turbulence is therefore created in the plane perpendicular to the flow plane P and parallel to the axis of the tube. This complementary turbulence accelerates the mixing of the gas with the TEG and reduces the flame lengths. The ratio of the sections between the orifices at the top and the orifices at the bottom may therefore vary between 0.25 and 4 and advantageously between 0.5 and 2.

Other advantages may become further apparent to the person skilled in the art on reading the following examples, illustrated by the appended figures, provided by way of illustration.

BRIEF DESCRIPTION OF THE DRAWINGS

FIG. 8 shows a variant of an in-stream burner consisting of a plurality of modules seen from the front, FIG. 8a is a section of FIG. 8 on the plane AA, FIG. 8b is a section of FIG. 8 on the plane BB, FIG. 9a shows in section a variant of the FIG. 8 burner on the plane AA, FIG. 9b is a section of the same variant as FIG. 9a on BB.

DETAILED DESCRIPTION

Figure 7:
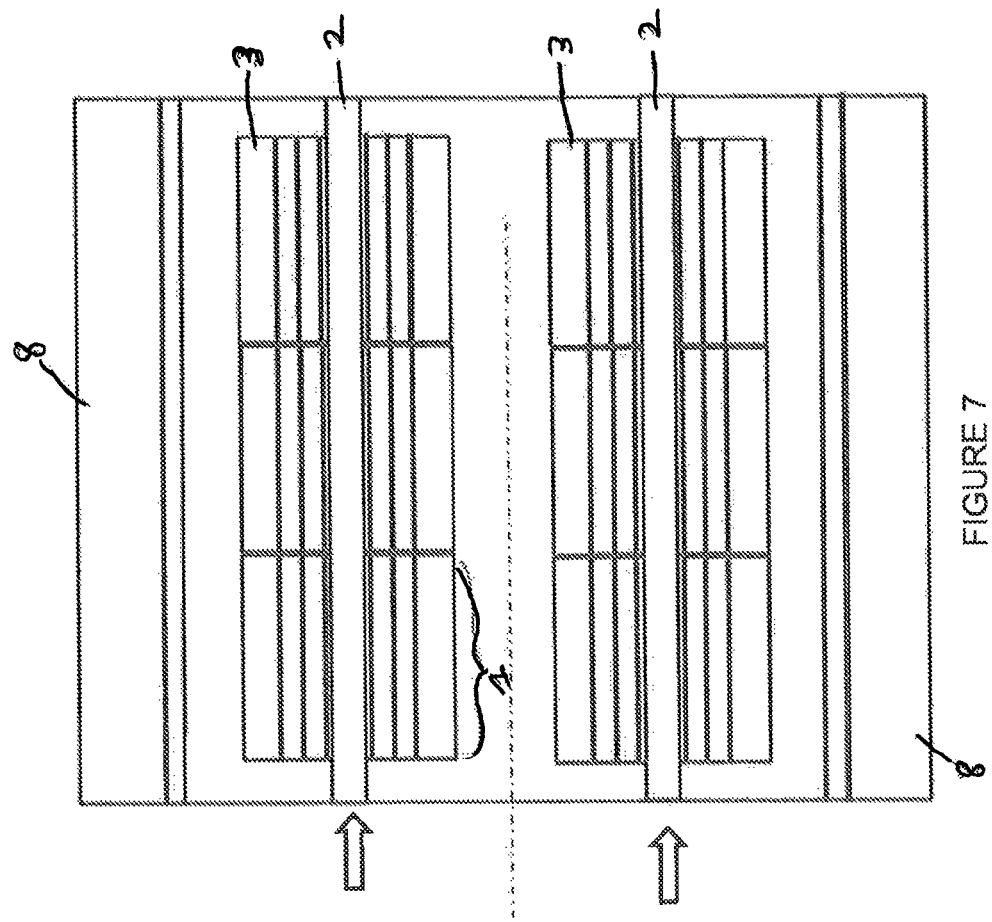
FIG. 7 is a rear view of FIG. 6.
Figure 6:
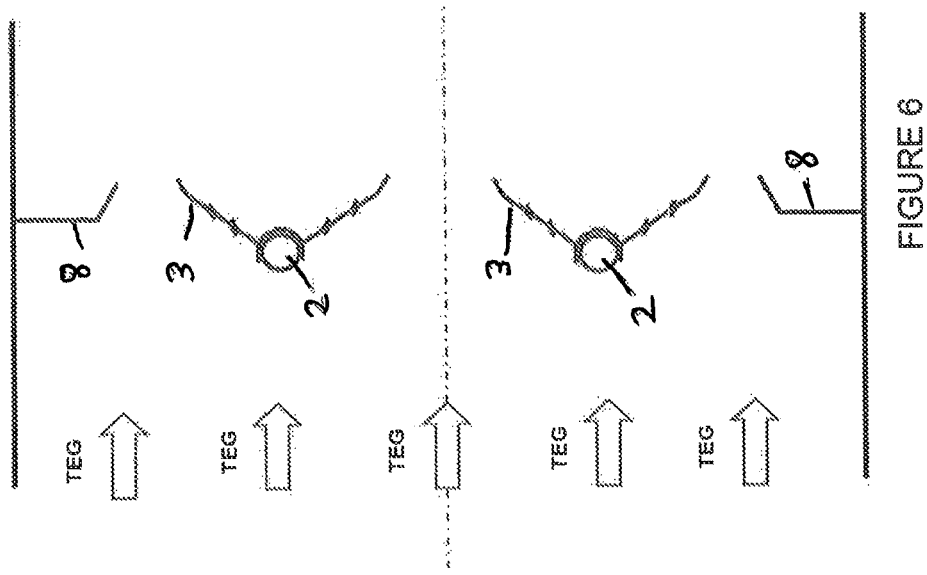
FIG. 6 is a view in section of an in-stream burner consisting of an assembly of burner modules.

The assemblies of in-stream burners that can be seen in FIG. 7 consist of a plurality of in-stream burner modules I disposed side-by-side, each in-stream burner module comprises a pipe 2 constituting a fuel feed pipe. Each burner module I comprises fins 3 disposed on either side of the pipe 2 in which the fuel 4 flows symmetrically with respect to a plane P and at an angle $\beta$. The fuel flows through injection orifices 20 symmetrically disposed on either side of the plane P.

The pipe 2 is covered by a shield 5 pierced with holes 50 facing the orifices 20.

The fins 3 on one side are at a greater or lesser distance from the pipe 2. The fin 30 is the closest, the fin 31 is at an intermediate location and the fin 32 is disposed farthest to the outside i.e. farthest from the pipe 2. The fins 30, 31, 32 are separated from one another by openings 33. It is of course possible to have more than or less than three fins.

The operation of the burner module will now be explained.

Figure 1:
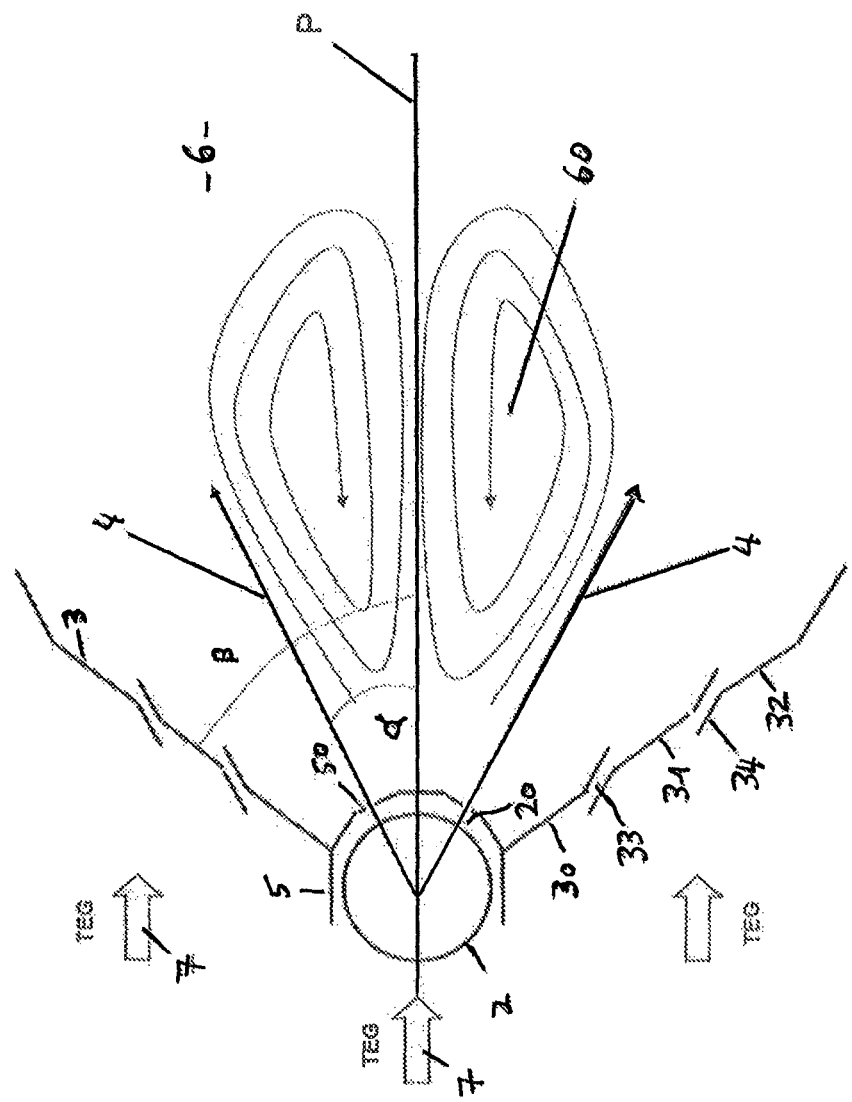
FIG. 1 is a view of a burner module in accordance with the invention showing the fuel flow.

The fuel 4 arrives via the pipe 2, it is injected into the combustion chamber 6 via the orifices 20. These orifices 20 are oriented with an angle α relative to the plane P of flow of the fuel. This angle makes it possible to delimit a space with no input of fuel and with no input of oxidant, which encourages internal recirculation of the combustion gases 4 inside the flame as shown in FIG. 1 by creating a principal vortex or turbulence 40 that brings toward the center a great part of the burnt gases. The angle β of the fins is between substantially 2α and 3α inclusive.

In the embodiment illustrated by FIGS. 8, 8a and 8b, the injection orifices 20 of the same module I have sections of different size and therefore different flow rates of fuel 4 on each side of the plane P, i.e. between the top and the bottom if P is horizontal. Thus by alternating modules I with the section size of the orifices 20 increased below the plane P and modules I with the section size of the orifices 20 increased above the plane P a component 41 radial to the main turbulence 40 is created. This radial component 41 reduces the flame lengths. The ratio of the sizes of the sections between the orifices 20 at the top and at the bottom can therefore vary between 0.25 and 4 and advantageously between 0.5 and 2.

In an embodiment illustrated by FIGS. 9a and 9b, the TEG openings 33 of the same module I have sections of different size between the top and the bottom sides of the plane P. Thus by alternating modules I with openings 33 of increased size at the bottom and modules with openings 33 of increased size at the top the complementary component 41 radial to the turbulence 40 is created or increased, which decreases the flame lengths.

Figure 2:
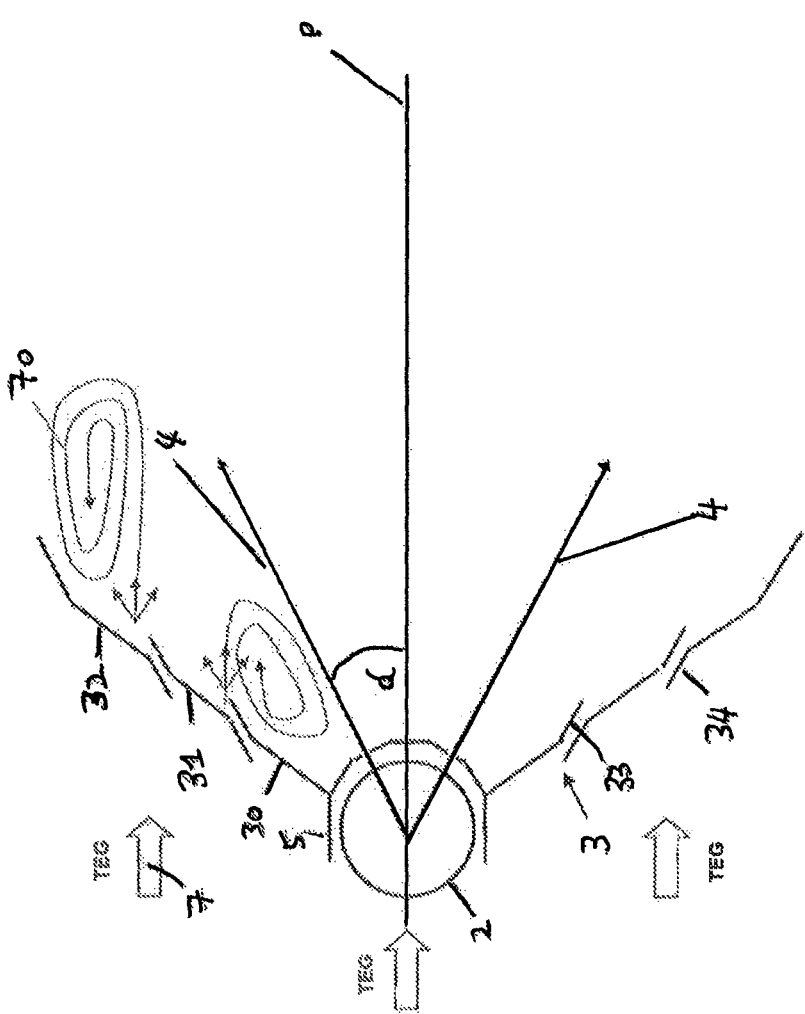
FIG. 2 is a view of the FIG. 1 burner module showing the oxidant flow.

FIG. 2 shows the circulation of the TEG 7 or turbine gases that enter via the openings 33 with an angle θ thanks to the deflection elements 34. This makes it possible to create a stabilization zone 70.

Figure 5:
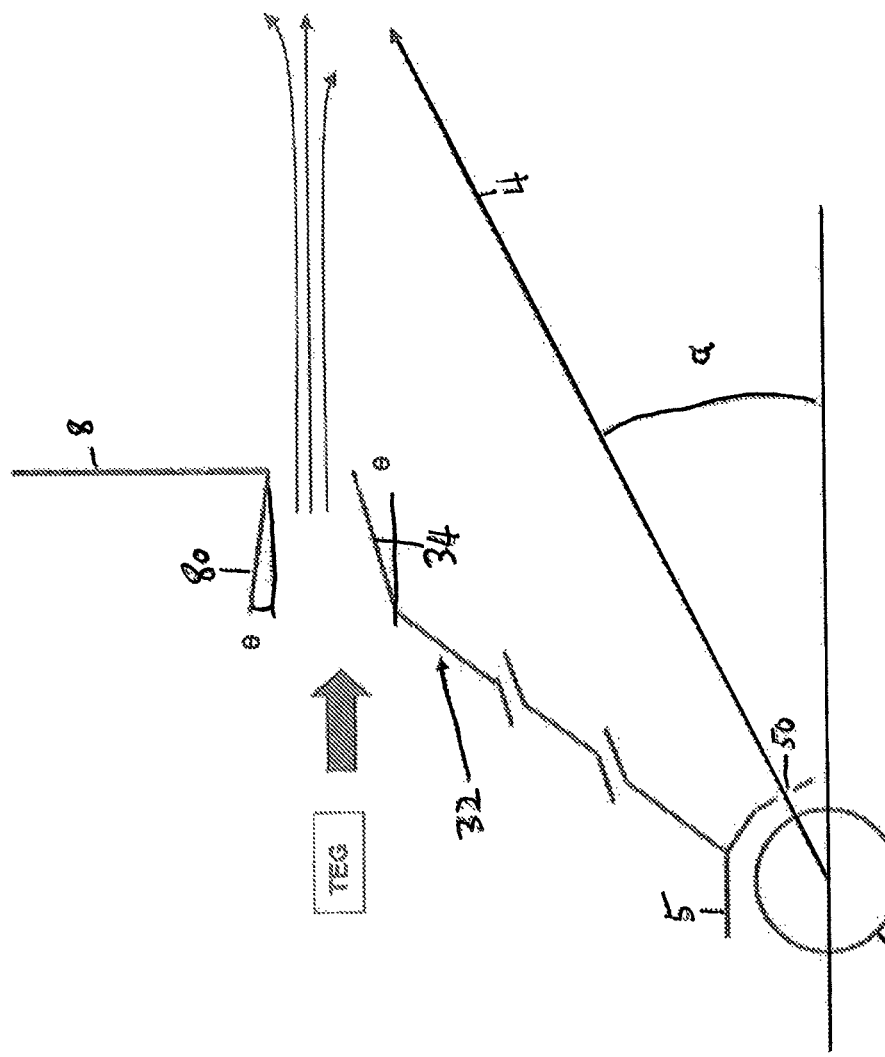
FIG. 5 is a view of one side of the fins.

As FIG. 5 illustrates, the baffles 8 have an end having a rim 80 that cooperate with the deflection element 34 of the fin 32 to enable a flow of the TEG 7 around the burner modules 1 parallel or nearly parallel to the plane P. The space between the deflection element 34 of the fin 32 and the rim 80 is larger than the openings 33. The rim 80 makes an angle θ.

Figure 3:
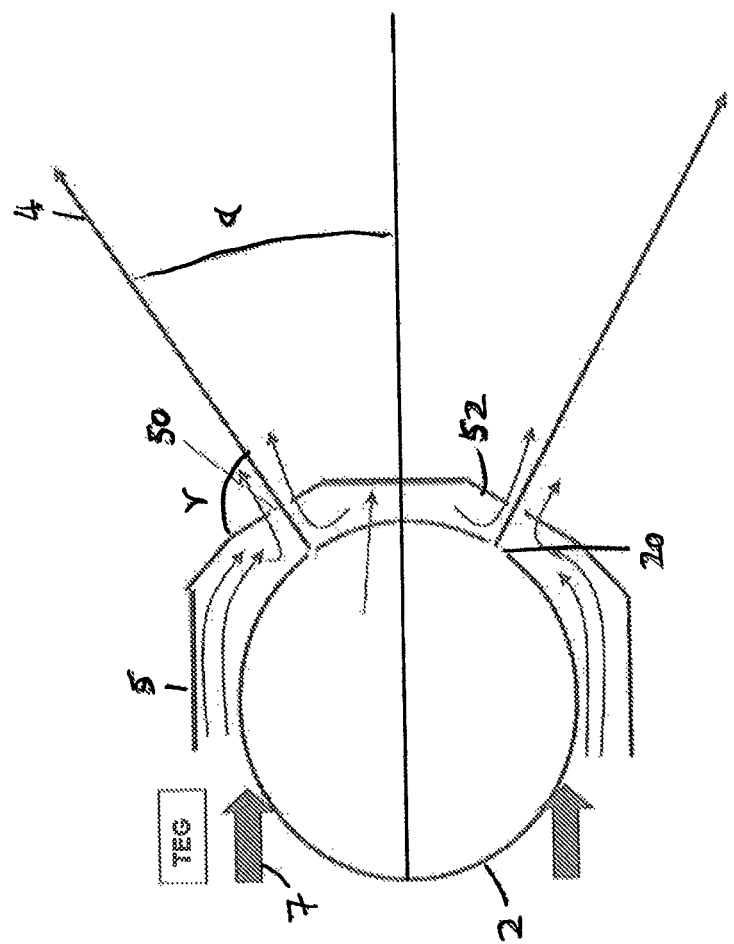
FIG. 3 is a detail of the pipe of the burner module.

Between the pipe 2 and the shield 5 circulate TEG (cf. FIG. 3) that are aspirated via the orifice 20, the diameter of which is preferably larger than that of the holes 50, toward the combustion chamber 6 and therefore enables premixing of the fuel 4. The shield 5 has plane walls 52 that are more favorable to the creation of vortices. The holes 50 enables the injection of the gas with an angle δ relative to the wall 52 of the shield 5.

Figure 4:
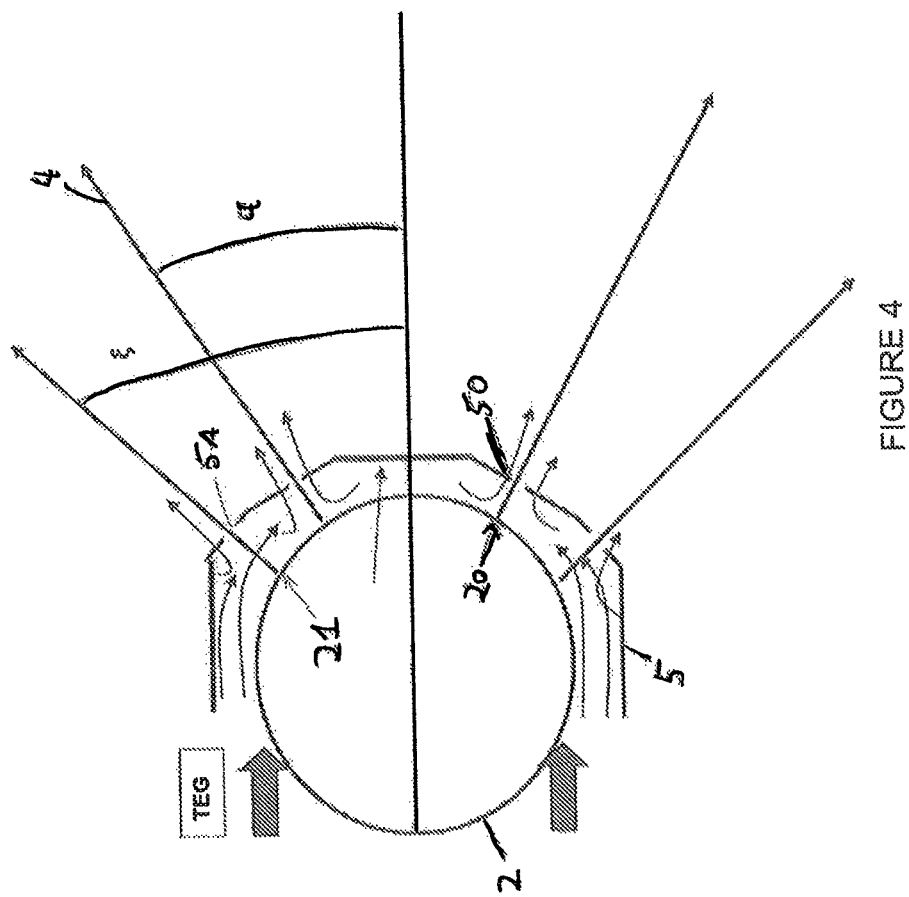
FIG. 4 is a variant of the pipe from FIG. 3.

In accordance with a variant FIG. 4 illustrates, the pipe 2 has secondary injection openings 21 that enable the injection of the fuel 4 with an angle ξ greater than α. Each secondary opening 21 is placed facing a secondary hole 51 of the shield 5. The quantity of fuel 4 injected is from 80% to 95% via the orifices 20 and the holes 50 and from 5% to 20% via the secondary orifices 21 and the secondary holes 51.

The invention claimed is:

1. A burner module in an air stream comprising:
a feed pipe of substantially circular cross section and having a central axis;
a plane P passing through the center of the feed pipe and parallel to an air stream;
at least two primary fuel injection orifices situated on a section of the pipe and intended to produce a flame, the at least two primary fuel injection orifices are arranged symmetrically with respect to the plane P, wherein each of the at least two primary fuel injection orifices is at an angle α with the plane P, the angle α is between 10° and 30° inclusive;
a first fin comprising a first deflection element;
a second fin comprising a second deflection element, wherein the first fin and the second fin are arranged symmetrically with respect to the plane P, wherein the first fin and the second fin are each at an angle β with the plane, and the angle β is between 2α and 3α;
wherein the first deflection element and the second deflection element are each at an angle θ with respect to the plane P, and the angle θ is substantially equal to the angle α;
a third fin comprising a third deflection element;
a fourth fin comprising a fourth deflection element, wherein the third fin and the fourth fin are arranged symmetrically with respect to the plane P, wherein the third fin and the fourth fin are each at the angle β with the plane P;
wherein the third deflection element and the fourth deflection element are each at the angle θ with respect to the plane P;
a first oxidant injection opening and a second oxidant opening that are arranged symmetrically with respect to the plane P, wherein the first oxidant injection opening is defined between the first deflection element and the third deflection element, and the second oxidant injection opening is defined between the second deflection element and the fourth deflection element;
wherein the third deflection element is positioned further downstream of the first oxidant injection opening relative to the air stream than the first deflection element; and
wherein the fourth deflection element is positioned further downstream of the second oxidant injection opening relative to the air stream than the second deflection element.

2. The burner module according to claim 1, wherein the at least two primary fuel injection orifices have different sizes on each side of the plane P.

3. The burner module according to claim 1, wherein at least two secondary fuel injection orifices are each at an angle ξ with the plane P and the angle ξ is greater than the angle α.

4. The burner module according to claim 3, wherein the at least two secondary fuel injection orifices have a total area representing 5% to 20% of the total area of the at least two primary fuel injection orifices.

5. The burner module according to claim 1, wherein the first oxidant injection opening and the second oxidant injection opening each have a total area between 3% and 15% inclusive of a total area of each of the first fin, the second fin, the third fin, and the fourth fin.

6. The burner module according to claim 1, wherein the first oxidant injection opening and the second oxidant injection opening have different sizes on each side of the plane P.

7. The burner module according to claim 1, further comprising:
a fifth fin comprising a fifth deflection element, wherein a third oxidant injection opening is defined between the third deflection element and the fifth deflection element, wherein respective sizes of the first oxidant injection opening and the third oxidant injection opening increase with the distance from the at least two primary fuel injection orifices.

8. The burner module according to claim 1, further comprising a shield placed downstream of the pipe with respect to the air stream, the shield having holes situated in line with the at least two primary fuel injection orifices.

9. The burner module according to claim 8, wherein the holes are situated on a wall of the shield, wherein each portion of the wall that correspond to one of the holes makes an angle δ substantially equal to 90° relative to a second central axis of a corresponding one of the at least two primary fuel injection orifices.

10. The burner module according to claim 9, further comprising baffles situated in an exterior part of the burner module and having an interior rim with an angle equal to and opposite that of the first deflection element.

11. A combustion process comprising providing an oxidant that has an oxygen concentration less than 21% to the burner module according to claim 1.

12. A combustion method comprising premixing in a space between a feed pipe and a shield of the burner module according to claim 8.

13. A burner comprising a plurality of burner consisting modules according to claim 1.

14. A burner comprising a pair of adjacent burner modules according to claim 2, wherein for each of the pair of adjacent burner modules, one of the at least two primary fuel injection orifices on a first side of the corresponding plane P has a different size than another of the at least two primary fuel injection orifices on an opposite side of the plane P.

15. A burner comprising a pair of adjacent burner modules according to claim 6, wherein for each of the pair of adjacent burner modules, the first oxidant injection opening on a first side of the corresponding plane P has a different size than the second oxidant injection opening on an opposite side of the plane P.

* * * * *